US 9,008,057 B2

(12) United States Patent
Hjelm et al.

(10) Patent No.: US 9,008,057 B2
(45) Date of Patent: Apr. 14, 2015

(54) GATEWAY APPARATUS AND PRESENCE MANAGEMENT APPARATUS

(75) Inventors: Johan Hjelm, Tokyo (JP); Takeshi Matsumura, Yokohama (JP); Shingo Murakami, Yokohama (JP); Toshikane Oda, Tokyo (JP); Kenta Yasukawa, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 293 days.

(21) Appl. No.: 13/139,374

(22) PCT Filed: Jan. 16, 2009

(86) PCT No.: PCT/JP2009/051025
§ 371 (c)(1),
(2), (4) Date: Jun. 13, 2011

(87) PCT Pub. No.: WO2010/082363
PCT Pub. Date: Jul. 22, 2010

(65) Prior Publication Data
US 2011/0243113 A1    Oct. 6, 2011

(30) Foreign Application Priority Data
Oct. 27, 2004    (GB) .................................. 0423845.7

(51) Int. Cl.
*H04W 92/06*        (2009.01)
*H04W 88/16*        (2009.01)
(Continued)

(52) U.S. Cl.
CPC ............. *H04L 65/1016* (2013.01); *H04W 8/06* (2013.01); *H04W 84/20* (2013.01); *H04L 65/1006* (2013.01); *H04L 65/1036* (2013.01); *H04L 67/24* (2013.01)

(58) Field of Classification Search
USPC ............ 709/238, 204, 207; 370/338; 455/414
See application file for complete search history.

(56) References Cited

U.S. PATENT DOCUMENTS

2003/0187650 A1    10/2003    Moore et al.
2006/0031368 A1*    2/2006    deCone .......................... 709/207
(Continued)

FOREIGN PATENT DOCUMENTS

JP    2002-217791 A    8/2002
JP    2008-518536 T    5/2008
(Continued)

OTHER PUBLICATIONS

Imai et al., Dynamic Resource Switching by Mobile Phone for FMC Seamless Service, *IEICE Technical Report*, NS2006-46, vol. 106, No. 167, Jul. 12, 2006, pp. 9-12.
(Continued)

*Primary Examiner* — Kevin C Harper
*Assistant Examiner* — Derrick V Rose
(74) *Attorney, Agent, or Firm* — Myers Bigel Sibley & Sajovec, PA

(57) ABSTRACT

One aspect of the present invention will provide a first gateway apparatus configured to be connectable to a local network and an external network, to obtain presence information of a device apparatus on the local network and to provide the obtained presence information to a presence management apparatus on the external network, the first gateway apparatus comprising, an obtaining unit configured to obtain the presence information of the device apparatus, a transmitter configured to transmit the presence information to the presence management apparatus via the external network, and a receiver configured to receive, from the presence management apparatus, a suppression instruction of the presence information transmission, wherein the transmitter further configured to suppress the transmission of the presence information to the presence management apparatus after the reception of the suppression instruction.

20 Claims, 18 Drawing Sheets

(51) Int. Cl.
  *H04L 29/06* (2006.01)
  *H04W 8/06* (2009.01)
  *H04L 29/08* (2006.01)
  *H04W 84/20* (2009.01)

(56) References Cited

U.S. PATENT DOCUMENTS

| | | | |
|---|---|---|---|
| 2006/0064473 A1* | 3/2006 | Borella et al. | 709/220 |
| 2006/0246880 A1 | 11/2006 | Baldwin et al. | |
| 2006/0256801 A1* | 11/2006 | Endo | 370/401 |
| 2006/0291486 A1* | 12/2006 | Cai et al. | 370/401 |
| 2008/0084977 A1 | 4/2008 | Nayak et al. | |
| 2009/0017796 A1* | 1/2009 | Foti | 455/414.1 |
| 2011/0026510 A1* | 2/2011 | Matsumura et al. | 370/338 |

FOREIGN PATENT DOCUMENTS

| | | |
|---|---|---|
| WO | WO 2005/086966 A2 | 9/2005 |
| WO | WO 2006/045706 A1 | 5/2006 |

OTHER PUBLICATIONS

International Search Report, PCT Application No. PCT/JP2009/051025, Feb. 17, 2009.
Written Opinion of the International Searching Authority, PCT/JP2009/051025, Feb. 17, 2009.
"Nanatsunogimonwotoku Q6 Koteitokeitaihadonoyouiyuugiousasruno?", Nikkei Computer, No. 666, Nov. 27, 2006, pp. 52-53.
Extended European Search Report, PCT Application No. PCT/JP2009/051025, Jul. 24, 2012.
Wegscheider et al: "Minimizing unnecessary notification traffic in the IMS presence system", Wireless Pervasive Computing, 2006 1st International Symposium On, IEEE, Piscataway, NJ, Jan. 16, 2006, XP007906313, DOI:10.1109/ISWPC.2006.1613579, ISBN: 978-0-7803-9410-0.

* cited by examiner

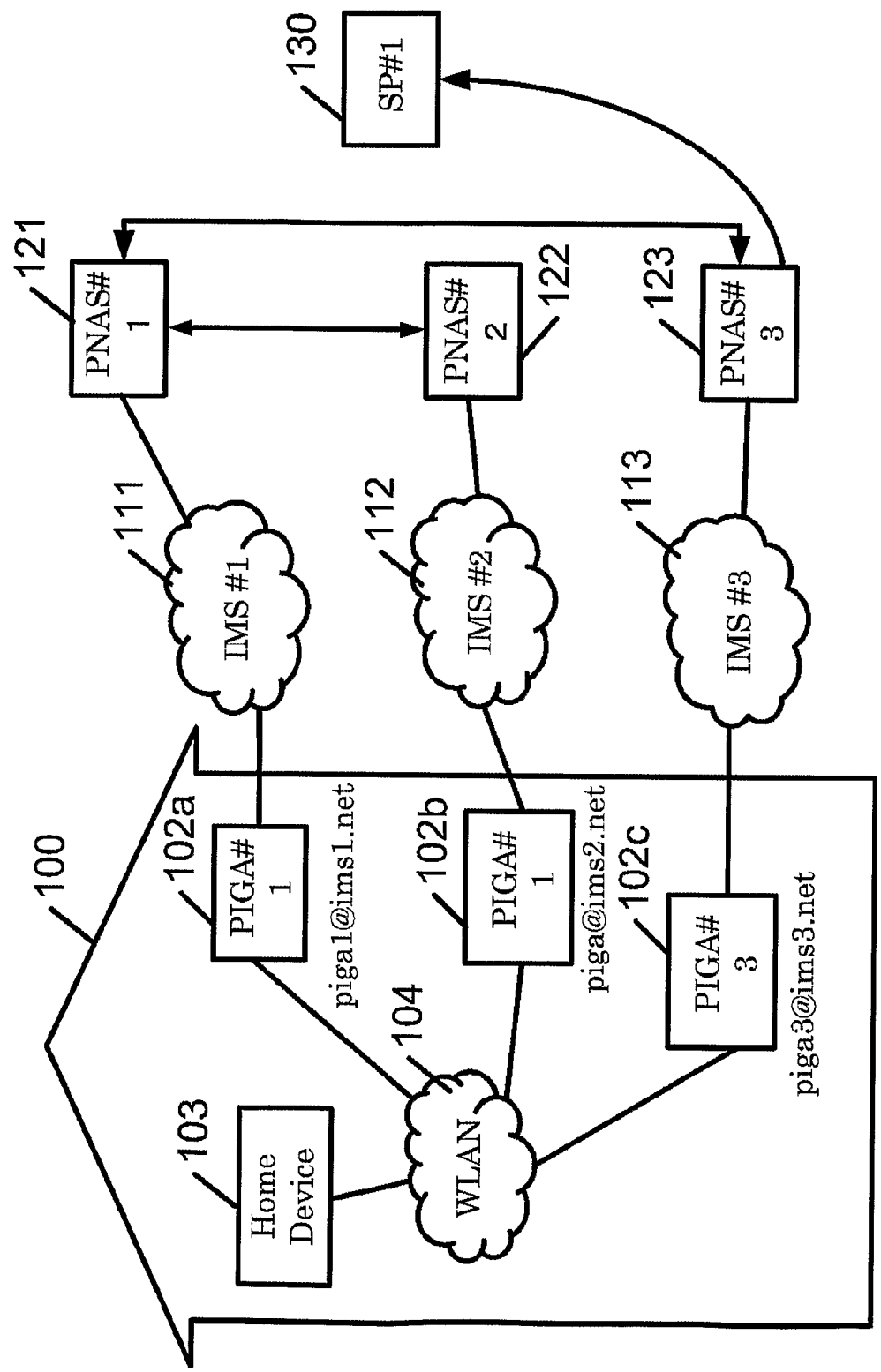

FIG. 3A

Table in PNAS#1

| IMPU | Device ID | Device type | Device name | ... |
|---|---|---|---|---|
| higa@ims1.net | uuid:12345 | Media Renderer | Family TV | ... |
| higa@ims1.net | uuid:23456 | Media Server | Family HDD | ... |
| martin@ims1.net | uuid:abcde | Media Server | Martin Blueray | ... |
| ... | ... | ... | ... | ... |

301 — IMPU
302 — Device ID
303 — Device type
304 — Device name
300

FIG. 3B

Table in PNAS#2

| IMPU | Device ID | Device type | Device name | |
|---|---|---|---|---|
| piga@ims2.net | uuid:34567 | Media Renderer | Dave TV | ... |
| alice@ims2.net | uuid:bcdef | Camera | Alice Camera | ... |
| ... | ... | ... | ... | ... |

Updated Table in PNAS#2

| IMPU | Device ID | Device type | Device name | |
|---|---|---|---|---|
| piga@ims2.net | uuid:12345 | Media Renderer | Family TV | ... |
| piga@ims2.net | uuid:23456 | Media Server | Family HDD | ... |
| piga@ims2.net | uuid:34567 | Media Renderer | piga TV | ... |
| alice@ims2.net | uuid:bcdef | Camera | Alice Camera | ... |
| ... | ... | ... | ... | ... |

Table in PNAS#1

| Master IMPU /411 | Slave IMPU /412 |
|---|---|
| smith@ims1.net | Alice@ims1.net |
| smith@ims1.net | dave@ims2.net |
| smith@ims1.net | bob@ims3.net |
| martin@ims2.net | fredrik@ims1.net |
| carl@ims2.net | erik@ims1.net |

Table in PNAS#2

| Master IMPU /421 | Slave IMPU /422 |
|---|---|
| smith@ims1.net | dave@ims2.net |
| martin@ims2.net | fredrik@ims1.net |
| carl@ims2.net | erik@ims1.net |
| erik@ims2.net | henrik@ims2.net |

Table in PNAS#3

| Master IMPU /431 | Slave IMPU /432 |
|---|---|
| smith@ims1.net | bob@ims3.net |

↘430

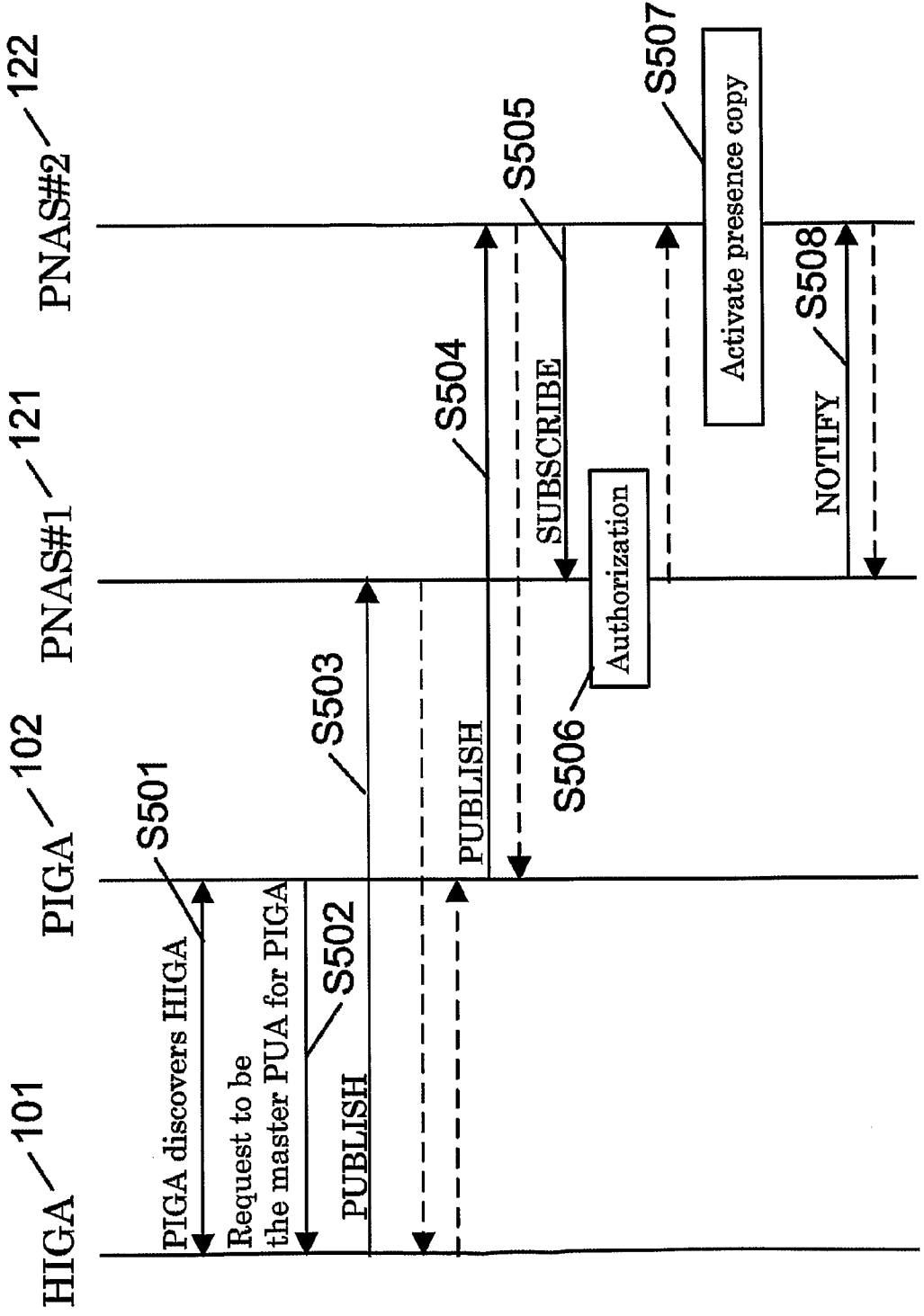

GATEWAY APPARATUS AND PRESENCE MANAGEMENT APPARATUS

CROSS REFERENCE TO RELATED APPLICATION

This application is a 35 U.S.C. §371 national stage application of PCT International Application No. PCT/JP2009/051025, filed on 16 Jan. 2009, the disclosure and content of which is incorporated by reference herein in its entirety. The above-referenced PCT International Application was published in the English language as International Publication No. WO 2010/082363 A1 on 22 Jul. 2010.

TECHNICAL FIELD

The present invention relates to gateway apparatus and presence management apparatus.

BACKGROUND

A network architecture called "IP Multimedia Subsystem" (IMS) has been developed by the 3rd Generation Partnership Project (3GPP) as an open standard for handling multimedia services and sessions in the packet domain (for details regarding the IMS, please refer to http://www.3gpp.org/ftp/Specs/html-info/22173.htm). Various communication terminals and devices (hereinafter referred to as IMS terminals) that conform to the IMS standard are now known. A typical example of an IMS terminal is a mobile phone with IMS functionality. A personal computer (PC), a personal digital assistant (PDA), or the like can also serve as IMS terminals if they are equipped with IMS functionality. IMS terminals can provide multimedia services by, for example, receiving video streaming from a video-streaming server over an IMS network.

According to International Publication No. WO 2006/045706 which discloses a IMS gateway (IG) enabling non-IMS terminals which do not have an IMS functionality such as a desktop PC and a laptop PC to access services via the IMS network. The IG is located in a private network, to which at least one user terminal is connected. The IG can be implemented on a "Set Top Box" (STB), a "Residential Gateway" (RGw) or other home devices.

The IG enables IMS services to be delivered to a residential network where various devices such as DLNA and also sensor devices are connected. This type of IG may be called as Home IMS gateway apparatus (HIGA). The service applications are not limited to the residential network but also to a device network in car controlled by Car IMS gateway apparatus (CIGA), and also to ad-hoc or a portable network controlled by Portable IMS gateway apparatus (PIGA). The word "xIGA" represents all these different types of IG. For details regarding the xIGA, please refer to "Bringing IMS services to the DLNA Connected home", Pervasive computing at Home WS in Sydney in May, 2008, "Virtually at home: High-performance access to personal media", Ericsson review, Issue #2/2008 or "Beyond the Connected Car: Using the Portable IMS Gateway as an in-car Interface to Home Services", ICT mobile summit, 2008.

PNAS (Personal Network Application Server) is an intelligent database system where device presence published by xIGA is aggregated and exposed to service providers or other types of watchers. It may also store service offering information from the service providers to expose them to home devices. PNAS has filter enforcement function so that users and the service providers can set filters to protect privacy and eliminate receiving data. In addition, it can generate statistics related to the collected information. For details regarding the PNAS, U.S. patent application Ser. No. 12/118,849 describes them.

SUMMARY

In case more than one xIGA is connected to the same residential network, both of them publish to the PNAS the same presence information of the devices connected to the network. Problem is that such a duplicated publication consumes unnecessary network and computation resources. Especially it leads to faster battery consumption in case of PIGA.

According to a first aspect of the invention, there is a provided a first gateway apparatus configured to be connectable to a local network and an external network, to obtain presence information of a device apparatus on the local network and to provide the obtained presence information to a presence management apparatus on the external network, the first gateway apparatus comprising, an obtaining unit configured to obtain the presence information of the device apparatus, a transmitter configured to transmit the presence information to the presence management apparatus via the external network, and a receiver configured to receive, from the presence management apparatus, a suppression instruction of the presence information transmission, wherein the transmitter further configured to suppress the transmission of the presence information to the presence management apparatus after the reception of the suppression instruction.

According to a second aspect of the invention, there is provided a presence management apparatus configured to manage presence information of a device apparatus on a local network, the presence management apparatus comprising a receiver configured to receive presence information from each of a plurality of gateway apparatuses connected to the local network and to obtain presence information from the device apparatus on the local network, a determination unit configured to determine a master gateway apparatus and a slave gateway apparatus among the plurality of the gateway apparatuses, and a transmitter configured to transmit a suppression instruction to the slave gateway apparatus as a response to the transmitted presence information from the slave gateway apparatus.

According to a third aspect of the invention, there is provided a presence management apparatus configured to manage presence information of a device apparatus on a local network, the presence management apparatus comprising a receiver configured to receive a message, from a first gateway apparatus configured to obtain presence information of a device apparatus on the local network, designating a second gateway apparatus on the local network as a master of the first gateway apparatus, and a transmitter configured to transmit a suppression instruction of presence information transmission to the first gateway apparatus as a response to the received message.

According to a fourth aspect of the invention, there is provided a first presence management apparatus configured to manage presence information of a device apparatus on a local network, the first presence management apparatus comprising a receiver configured to receive a message, from a first gateway apparatus configured to obtain presence information of a device apparatus on the local network, designating a second gateway apparatus on the local network as a master of the first gateway apparatus, and a transmitter configured to transmit a setting message which causes a second presence management apparatus associated with the second gateway apparatus to have a transmission setting of the presence information to the first presence management apparatus when the second presence management apparatus receives the presence information from the second gateway apparatus, wherein when the presence information is received from the first gateway apparatus, the transmitter transmits a suppression instruction of the presence information transmission to the first gateway apparatus as a response to the received presence information.

According to a fifth aspect of the invention, there is provided a first presence management apparatus configured to manage presence information of a device apparatus on a local network, the first presence management apparatus comprising a receiver configured to receive a message, from a first gateway apparatus configured to obtain presence information of a device apparatus on the local network, designating a second gateway apparatus as a slave of the first gateway apparatus, and a setting message, from a second presence management apparatus associated with the second gateway apparatus, causes the first presence management apparatus to transmit presence information to the second presence management apparatus when the first presence management apparatus receives the presence information from the first gateway apparatus, and a transmitter configured to transmit the presence information to the second presence management apparatus when the presence information is received from the first gateway apparatus after the reception of the setting message.

Further features of the present invention will become apparent from the following description of exemplary embodiments with reference to the attached drawings.

BRIEF DESCRIPTION OF DRAWINGS

FIG. 1C shows other exemplary system according to expanded embodiment of the present invention corresponding to a multi-operator case;

FIGS. 3A through 3C show examples of data structure corresponding to the presence management table 222 according to the embodiment of the present invention;

FIG. 4B through 4D show Master-Slave relationship management tables according to the embodiment of the present invention;

FIGS. 5 and 6 show an exemplary sequence diagram describing preparation procedures of the embodiment of the present invention by determining the role of the master PUA;

DETAILED DESCRIPTION

Embodiments of the present invention will now be described with reference to the attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are always indispensable for the present invention.

Figure 12:
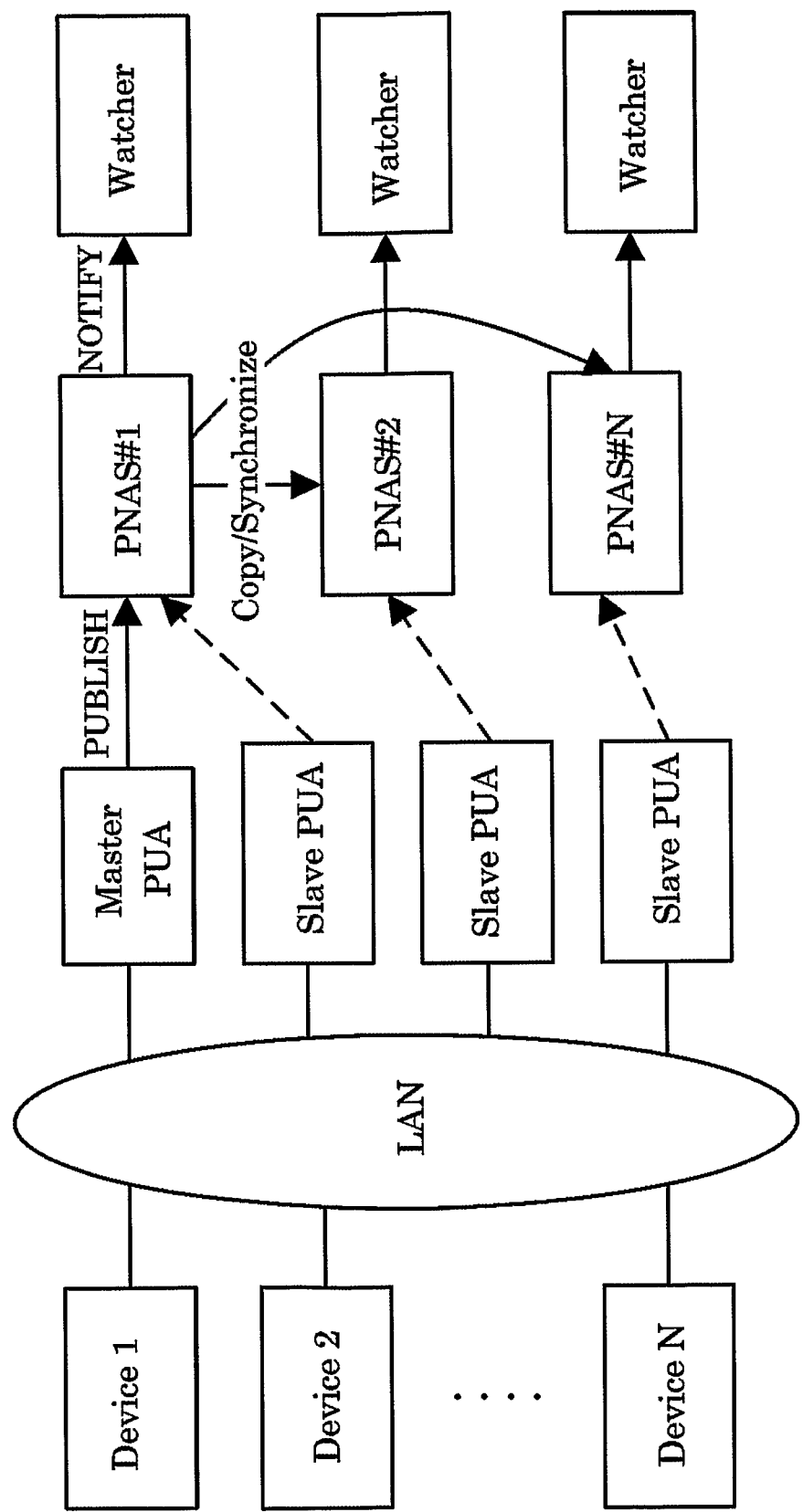
FIG. 12 shows the concept of the present invention using the master PUA and the slave PUAs according to embodiments of the present invention.

The present invention according to the embodiments relates to a mechanism to select one IG from a group of IGs as a master PUA (Presence User Agent) and suppress publication from the other IG(s) as a slave PUA (Presence User Agent) on the same local network, and synchronize or copy the device presence among a plurality of PNASs as presence management apparatuses in a transparent way to the device presence watchers. FIG. 12 shows the concept of the present invention using the master PUA and the slave PUAs according to embodiments of the present invention. Dotted arrow lines from each slave PUA to each PNAS indicates the suppressed publication from the slave PUAs according to the concept of the present invention.

The mechanism to copy or synchronize the device presence information on the same local network among two or more PNAS allows providing the latest device presence information to the watchers even while the publication is suppressed. When the Presence User Agent joins to or leaves from the local network, the above suppression mechanism is started or terminated in a way that the device presence information is provided to the watchers seamlessly.

In the following embodiments, as an example, a case, where an IG for residential use and fixedly located at user's home which may be called as HIGA, and a portable IG generally for mobile use and the user can bring it with him outside of the home which may be called as PIGA are used, will be described. It should be noted that the embodiments of the present invention will not be limited to the case using the pair of the HIGA and PIGA, and the embodiments may be applied to a case of arbitrary combination of any types of IGs including HIGA, PIGA, CIGA and so on.

Figure 1A:
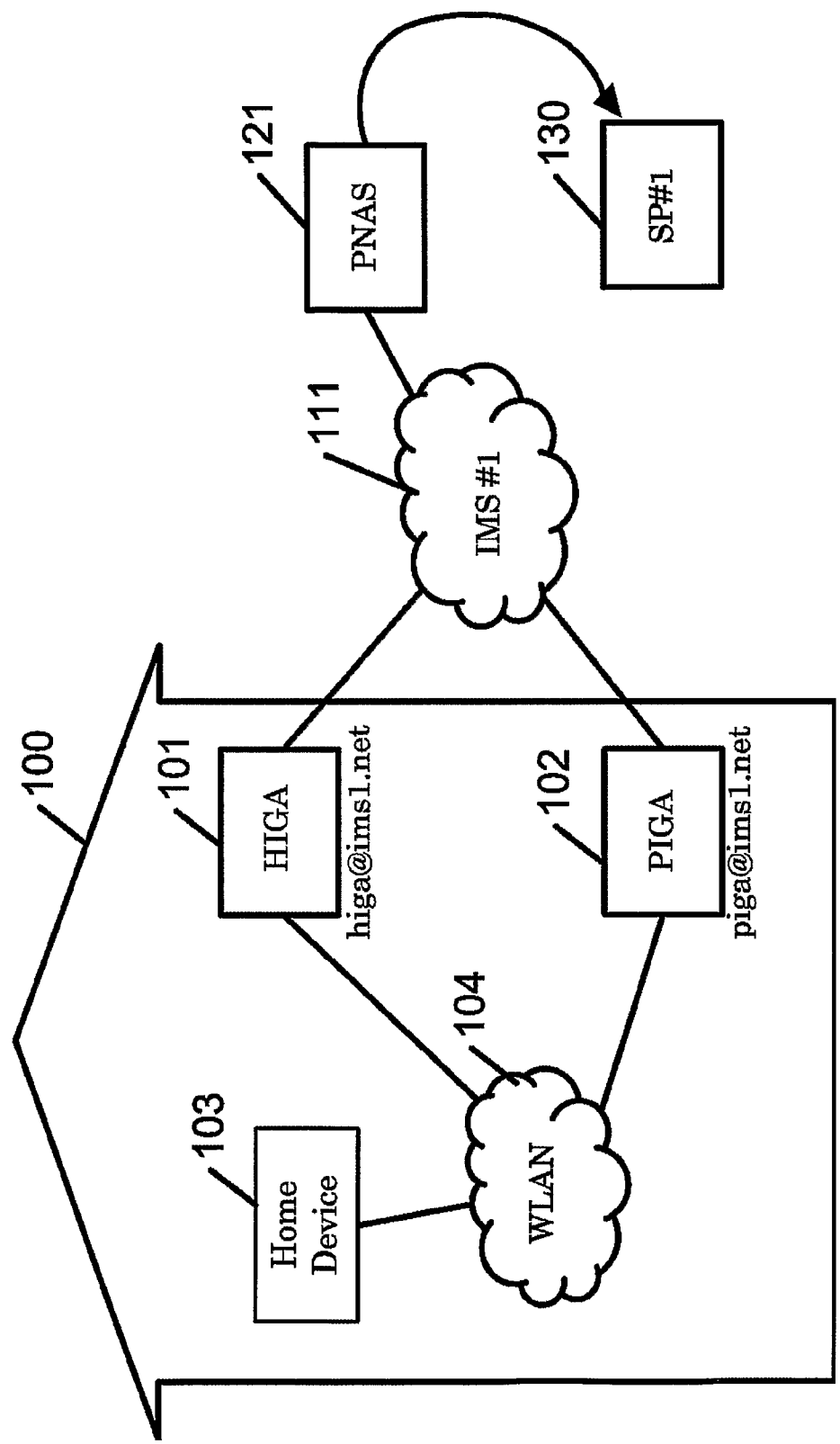
FIG. 1A shows an exemplary system according to one embodiment of the present invention corresponding to a single-operator case.

FIG. 1A shows an exemplary system according to one embodiment of the present invention corresponding to a single-operator case. For simplification, a pair of HIGA 101 and PIGA 102 is used for describing the invention; however, the invention can cover the different types of xIGA and more than two of them. In this system, HIGA 101, PIGA 102 and home device 103 are communicatively coupled each other via a local network of a Wireless Local Area Network (WLAN) 104. The local network may be local area network (LAN) based on Ethernet, Bluetooth network or other local network. The HIGA 101 is a home IMS gateway apparatus generally for residential use and fixedly located at home 100 of the HIGA user. The PIGA 102 is a portable IMS gateway apparatus generally for mobile use and the user can bring the PIGA 102 with him outside of the home 100. The PIGA 102 may be configured as a mobile terminal, a mobile phone, a personal digital assistant (PDA) or a laptop computer with home IMS gateway function.

The HIGA 101 and PIGA 102 are communicatively coupled to the IMS network 111 operated by a single IMS operator. The HIGA 101 and PIGA 102 collect device presence on the local network 104 and publish them to the PNAS 121 via the IMS network 111. Different IMPU are assigned to the HIGA 101 and PIGA 102. In the single operator case according to FIG. 1A, the HIGA 101 and PIGA 102 report the device presence to the same PNAS 121. The PNAS 121 aggregates the device presence from a plurality of IMS home gateway apparatuses of the HIGA 101 and PIGA 102, maintains the subscriptions from service providers and notifies them of device presence changes.

The home device 103 has a network interface and has a control mechanism over the network such as DLNA (Digital Living Network Alliance), UPnP (Universal Plug-and-Play), ZigBee, ECHONET, SIP (Session Initiation Protocol), HTTP (Hyper Text Transfer Protocol), Bluetooth and so on. In FIG. 1A, although the number of the home device 103 is one, this is described as an example and the number should not be limited to it. The home device 103 may include any one of a television, a DVD/HDD/BD recorder, a laptop computer, a desktop computer, a printer, a media server, a digital camera, a digital video camera (camcorder), an acceleration sensor, a temperature sensor, a direction sensor, a location sensor and so on.

Service provider (SP) 130 can be an IMS AS connected to S-CSCF over ISC interface, or a server on another type of network such as the Internet connected to the PNAS 121. The SP 130 can behave as the presence watcher which receives presence information from the PNAS 121.

Figure 1B:
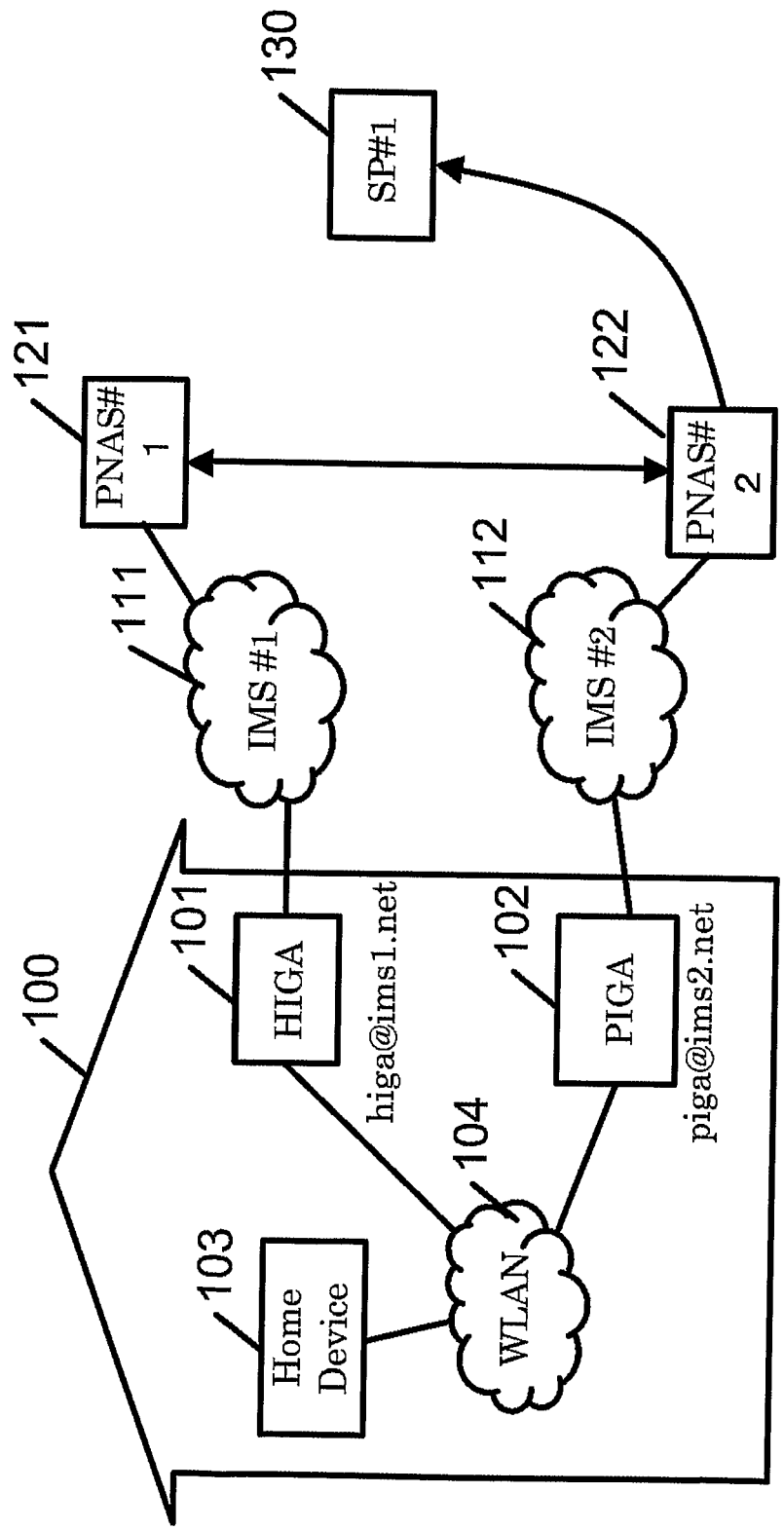
FIG. 1B shows another exemplary system according to another embodiment of the present invention corresponding to a multi-operator case.

FIG. 1B shows another exemplary system according to another embodiment of the present invention corresponding to a multi-operator case. A pair of HIGA 101 and PIGA 102 is also used to describe the invention for simplification; however, the invention can cover the different types of xIGA and more than two of them. In FIG. 1B, a basic system configuration is the same as the one shown in FIG. 1A, however, the system of FIG. 1B corresponds to a case where the HIGA 101 and PIGA 102 are respectively connected to different IMS networks of IMS#1 111 and IMS#2 112 each of which is operated by a different operator. Basically, PNAS#1 121 aggregates the device presence from the HIGA 101 and PNAS#2 122 aggregates the device presence from the PIGA 102. FIG. 1B also shows a case where the PNAS#2 122 maintains the subscriptions from service providers and notifies them of device presence changes.

In the following, detailed description about embodiments of the present invention will be provided in association with the multi-operator case. Though applications specific to the single-operator case will be provided when necessary, the same procedures are basically applicable to that case without major changes to the multi-operator case.

Figure 2A:
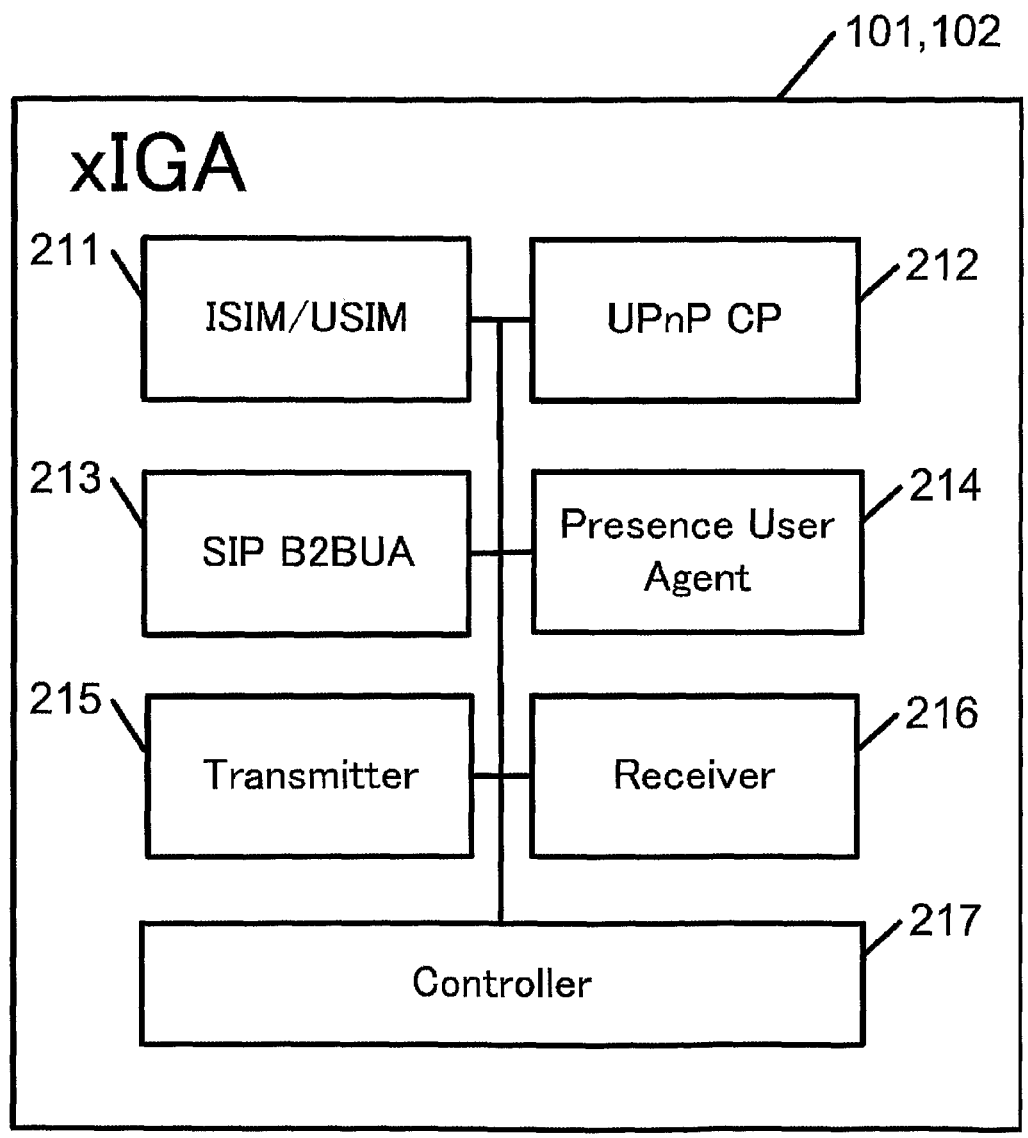
FIG. 2A shows an exemplary IMS gateway apparatus 101/102 according to the embodiment of the present invention.

FIG. 2A shows an exemplary IMS gateway apparatus 101/102 according to the embodiment of the present invention. The exemplary IMS gateway 101/102 includes a ISIM/USIM 211, an UPnP Control Point (CP) 212, a SIP Back-to-Back User Agent (B2BUA) 213, a presence user agent 214, a transmitter 215, a receiver 216 and controller 217.

In FIG. 2A, the ISIM/USIM 211 stores essential information for each IMS gateway to work as an IMS client, such as IMS public identity (IMPU). The UPnP CP 212 performs the device discovery for detecting the home device 103 on the WLAN 104 and controls the discovered device. The SIP B2BUA 213 performs the conversion between IETF SIP and IMS SIP so that a device connected to the IMS gateway apparatus that is not IMS-enabled can access the IMS operator network. The presence user agent 214 publishes device presence information relating to the home device communicatively coupled to the IMS gateway apparatus.

The transmitter 215 is an interface for information transmission by communicatively coupling to IMS network 111/112 and the WLAN 104 (which is UPnP-based and/or SIP-based) to communicate with the home device 103 or other IMS gateway apparatuses. The receiver 216 is an interface for information reception by communicatively coupling to IMS network 111/112 and the WLAN 104 (which is UPnP-based and/or SIP-based) to communicate with the home device 103 or other IMS gateway apparatuses. The controller controls overall processing of the IMS gateway apparatus and perform processing to be executed according to the embodiments of the present invention including transmission and/or reception of information and home device detection, etc.

Figure 2B:
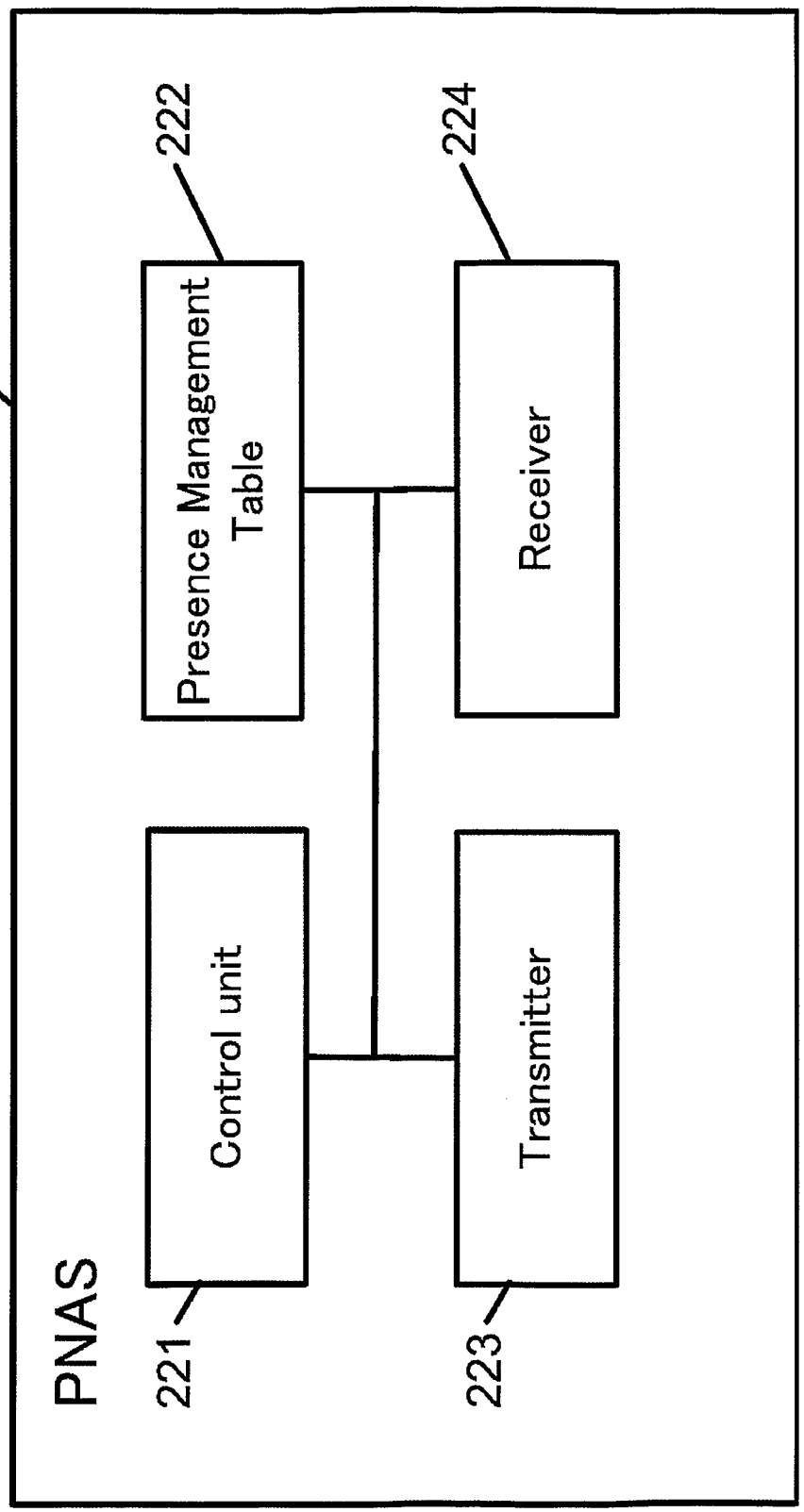
FIG. 2B shows an exemplary PNAS according to the embodiment of the present invention.

FIG. 2B shows an exemplary PNAS according to the embodiment of the present invention. The PNAS includes a control unit 221, a presence management table 222, a transmitter 223, a receiver 224.

The controller 221 executes processing necessary for controlling the PNAS. The presence management table 222 stores device presence received from IMS gateway apparatus via IMS network. Examples of data structures of the presence management table 222 will be described with reference to FIGS. 3A through 3C. The transmitter 223 is an interface for information transmission by communicatively coupling to IMS network 111/112. The receiver 224 is an interface for information reception by communicatively coupling to IMS network 111/112.

In FIGS. 2A and 2B, each module may be implemented as an independent hardware module which executing corresponding processing program to achieve desired functions, or a software module including corresponding process codes executed in a processor, such as CPU, MPU, VGA, FPGA, ASIC or DSP.

FIGS. 3A through 3C show examples of data structure corresponding to the presence management table 222 according to the embodiment of the present invention. FIG. 3A shows a table as the presence management table 222 stored in PNAS #1 121 of FIG. 1B, and FIG. 3B shows a table as the presence management table 222 stored in PNAS #2 122 of FIG. 1B. FIG. 3C shows a table as the presence management table 222 stored in PNAS #2 122 which is updated based on the mechanism according to the embodiments of the present invention.

In FIGS. 3A through 3C, each tables stores IMPU 301, Device ID 302, Device type 303 and Device name 304 and so on as table entries. IMPU 301 shows the IMS public identity of the IMS gateway apparatus such as HIGA 101 or PIGA 102. IMPU 301 is used as an identifier for each IMS gateway apparatus. Device ID 302 shows an identifier of the home device 103 detected in the local network (WLAN 104) and may be an UUID (Universal Unique Identifier). Device type 303 shows a type of corresponding home device 103 such as "Media Renderer" and "Media Server". The Device name shows a name designated by the user to the corresponding home device.

Figure 6:
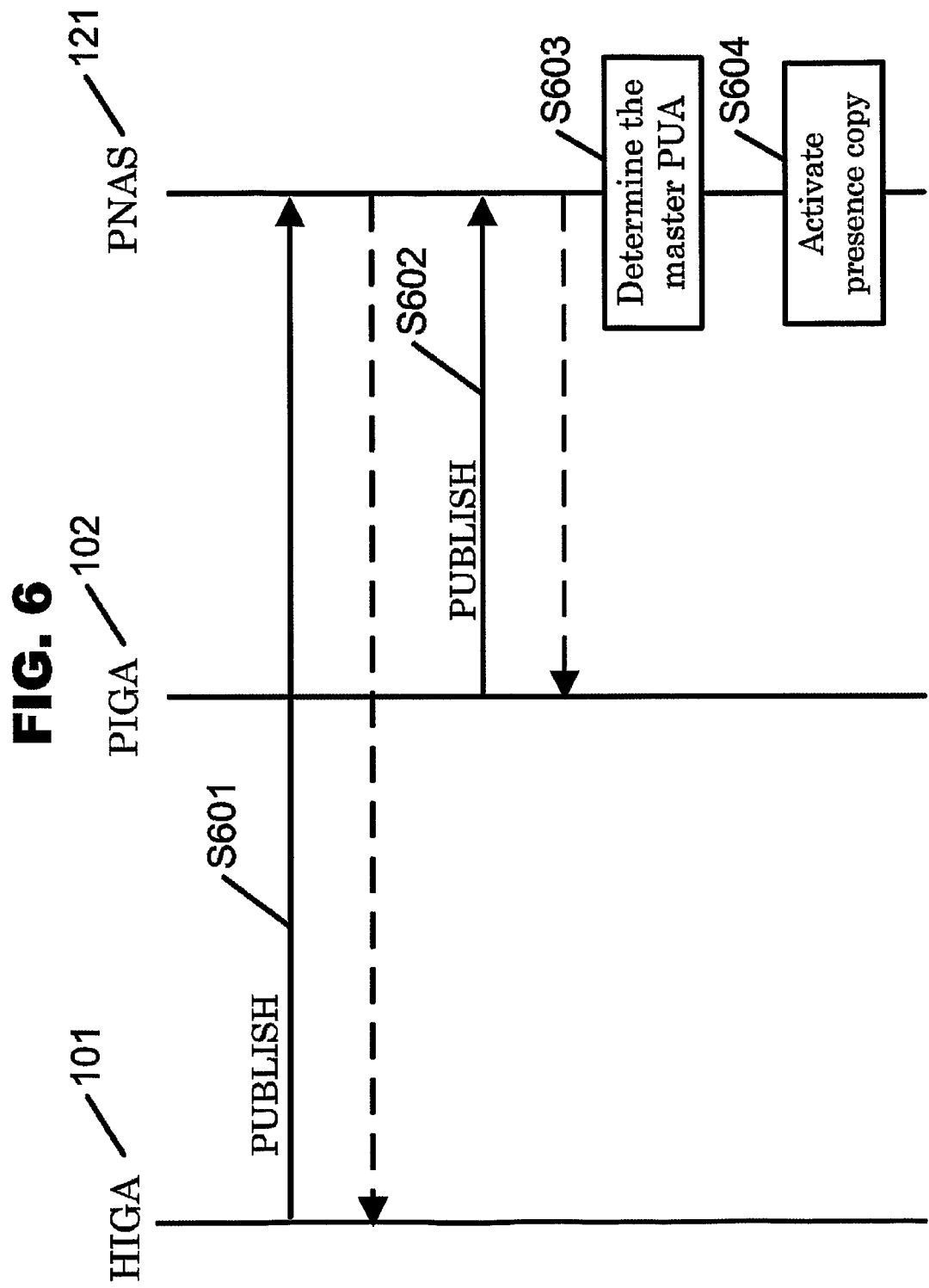

FIGS. 5 and 6 show an exemplary sequence diagram describing preparation procedures of the embodiment of the present invention by determining the role of the master PUA. In order to determine the role, for example, types of the IMS gateway apparatuses including mobile or fixed may be considered. How likely it is going to leave the local network in case of a mobile may also be considered. Further, capability of the hardware such as the CPU, memory and the network interface and types of power supply including battery powered or plugged may be considered. In case of battery powered type, remaining battery may also be considered. Furthermore, network bandwidth and its cost may be considered. Cellular network usually costs more than fixed network for example. Energy cost can also be taken into account, for example Bluetooth consumes much less power than the WLAN. The information can be obtained from the PNAS as it has the device presence and also some historical data and statistics of it. If the negotiation will be done locally among IMS gateway apparatuses, they can download the necessary information from the PNAS. If the negotiation will be carried out by PNAS, then PNAS may retrieve missing information from IMS gateway apparatuses.

FIG. 5 shows a case where the IMS gateway apparatus determines the role, in the following the PIGA 102 which newly joins to the local network of WLAN 104 determines to become the slave apparatus. In FIG. 5, a dotted line indicates the "200 OK" response according to the SIP protocol corresponding to the SIP request immediately before it.

When the PIGA 102 joins to the local network (WLAN 104), the PIGA 102 discovers HIGA 101 in step S501. The PIGA 102 queries the IMPU of HIGA 101 and receives "higa@ims1.net". In step S501, the HIGA 101 may discover the PIGA 102 and notifies its presence to the PIGA 102. In step S502, the PIGA 102 requests the HIGA 101 to be the master PUA and to report device presence on the WLAN 104 instead of the PIGA 102. The PIGA 102 gives its IMPU piga@ims2.net to the HIGA 101 as a parameter of the request.

The discovery at the step S501 and the information exchange at the step S502 may be done using UPnP by UPnP CP 212 for example, though a new device profile to represent xIGA or PUA will be necessary in order to exchange the IMPU etc here. Note that the protocol here is not limited to the UPnP.

In step S503, the HIGA 101 sends SIP PUBLISH to report PIGA's presence including the slave PUA at piga@ims2.net to PNAS #1 121 which manages device presence from the HIGA 101. An example of the header portions of PUBLISH message necessary for explanation of this embodiment is shown as follows. Other portions which should be included in the header correspond to the standards of the corresponding RFC and 3GPP and their explanation will be omitted in this embodiment.

PUBLISH sip:higa@ims1.net SIP/2.0
Via: SIP/2.0/UDP 192.121.123.123; branch=z9hG4bK652hsge
To: <sip:higa@ims1.net>
From: <sip:higa@ims1.net>;tag=1234wxyz
Call-ID: 81818181@ims1.net
CSeq: 1 PUBLISH
Max-Forwards: 70
Expires: 3600
Event: device_presence
Content-Type: application/pidf+xml
Content-Length: . . .
P-Slave-PUA-Identity: sip:piga@ims2.net
[Published device presence document]

In the above example, the P-Slave-PUA-Identity header indicates the PIGA 102 as the slave PUA. This header is introduced according to the embodiment of the present invention. The device presence document may be in any format, though the PIDF document defined in RFC3863 could be utilized as it is a standard format to convey the presence information in the IMS.

In step S504, the PIGA 102 sends SIP PUBLISH to report HIGA's presence including the master PUA at higa@ims1.net to PNAS#2 122 which manages device presence from the PIGA 102. An example of the header portions of PUBLISH message necessary for explanation of this embodiment is shown as follows. Other portions which should be included in the header correspond to the standards of the corresponding RFC and 3GPP and their explanation will be omitted in this embodiment.

PUBLISH sip:piga@ims2.net SIP/2.0
Via: SIP/2.0/UDP 61.196.123.123; branch=z9hG4bK652hsge
To: <sip:piga@ims2.net>
From: <sip:piga@ims2.net>;tag=1234wxyz
Call-ID: 91919191@ims2.net
CSeq: 1 PUBLISH
Max-Forwards: 70
Expires: 3600
Event: device_presence
Content-Type: application/pidf+xml
Content-Length: . . .
P-Master-PUA-Identity: sip:higa@ims1.net
[Published device presence document]

In the above example, the P-Master-PUA-Identity header indicates that the PIGA 102 wants to activate copy of the device presence information from the HIGA 101 as the master PUA. This header is introduced according to the embodiment of the present invention.

In step S505, the PNAS#2 122 sends SIP SUBSCRIBE to subscribe for device presence at higa@ims1.net to PNAS#1 121. In this step, IMS#2 112 routes the SUBSCRIBE message to the IMS#1 111 according to the domain name of the IMPU higa@ims1.net, and then the S-CSCF in the IMS#1 111 routes the SUBSCRIBE message to the PNAS#1 according to the Initial Filter Criteria (iFC) of IMPU higa@ims1.net. An example of the header portions of SUBSCRIBE message necessary for explanation of this embodiment is shown as follows. Other portions which should be included in the header correspond to the standards of the corresponding RFC and 3GPP and their explanation will be omitted in this embodiment.

In step S506, when the PNAS#1 receives the SIP SUBSCRIBE, it checks the P-Asserted-Identity header of the request to know that PNAS#2 subscribes on behalf of PIGA 102 having the IMPU of piga@ims2.net. The subscription requested at S505 is authorized if the IMPU is verified as the slave PUA reported at step S503. If it's not authorized, PNAS#1 121 returns a SIP error response at the dotted line under 5505 SUBSCRIBE.

In S506, this authorization may be done based on a pre-configured access control list specifying a set of IMPU that are allowed to become a slave PUA. The access control list may be managed by using XCAP protocol and stored in the HSS, PNAS or another database.

In step S507, PNAS#2 activates presence copy function so that device presence reported for higa@ims1.net is going to be copied to piga@ims2.net if it receives the successful SIP response at the dotted line under S505 SUBSCRIBE.

In step S508, the PNAS#1 121 sends SIP NOTIFY back to the PNAS#2 122. This is an initial NOTIFY message so it may contain nothing, or it may contain device presence associated to higa@ims1.net.

According the above procedure, PNAS#1 121 and PNAS#2 122 can create a table for managing Master-Slave relationship between the HIGA 101 and the PIGA 102. Detailed example of the Master-Slave relationship management table will be provided with reference to FIG. 4B through 4D below.

Though the above description corresponds to the multi-operator case, in the single operator case, PUBLISH messages from the RIGA 101 and the PIGA 102 arrive at the same PNAS 121 and the SUBSCRIBE/NOTIFY dialog will not be used. The presence copy function can be activated after The PNAS 121 has received the PUBLISH message from the slave PUA (i.e. the PIGA 102), and the 200 OK response for the PUBLISH (S504) can contain the instruction to suppress the following PUBLISH messages.

FIG. 6 shows a case where the PNAS determines the role of each IMS gateway apparatus on the local network of WLAN 104. FIG. 6 shows a single operator case as the example, however, the procedure can be extended to the multi-operator case as well, though it requires service agreement between PNAS of those operators. In FIG. 6, a dotted line indicates the "200 OK" response according to the SIP protocol corresponding to the SIP request immediately before it.

In step S601, the HIGA 101 sends SIP PUBLISH to publish device presence on the local network of WLAN 104 to the PNAS 121. An example of the header portions of PUBLISH message necessary for explanation of this embodiment is shown as follows. Other portions which should be included in the header correspond to the standards of the corresponding RFC and 3GPP and their explanation will be omitted in this embodiment.

PUBLISH sip:higa@ims1.net SIP/2.0
Via: SIP/2.0/UDP 192.121.123.123; branch=z9hG4bK652hsge
To: <sip:higa@ims1.net>
From: <sip:higa@ims1.net>;tag=1234wxyz
Call-ID: 81818181@ims1.net
CSeq: 1 PUBLISH
Max-Forwards: 70
Expires: 3600
Event: device_presence
Content-Type: application/pidf+xml
Content-Length: . . .
[Published device presence document]

In step S602, the PIGA 102 sends SIP PUBLISH to publish device presence on the local network of WLAN 104 to the PNAS 121. An example of the header portions of PUBLISH message necessary for explanation of this embodiment is shown as follows. Other portions which should be included in the header correspond to the standards of the corresponding RFC and 3GPP and their explanation will be omitted in this embodiment.

PUBLISH sip:piga@ims2.net SIP/2.0
Via: SIP/2.0/UDP 61.196.123.123; branch=z9hG4bK652hsge
To: <sip:piga@ims2.net>
From: <sip:piga@ims2.net>;tag=1234wxyz
Call-ID: 91919191@ims2.netCSeq: 1 PUBLISH
Max-Forwards: 70
Expires: 3600
Event: device_presence
Content-Type: application/pidf+xml
Content-Length: . . .
[Published device presence document]

In step S603, the PNAS 121 associates higa@ims1.net and piga@ims1.net and determines the master PUA. One way of creating the association is to check if the HIGA 101 and the PIGA 102 belong to the same IMS subscription.

In step S603, the master PUA selection may be based on the user's preference pre-configured in the HSS or based on the capability information of the HIGA 101 and the PIGA 102. In step S604, the PNAS 121 activates the presence copy function in order to copy the device presence information from the HIGA 101 to the PIGA 102.

After the HIGA 101 and the PIGA 102 take role of either master or slave PUA, the device presence publication from the slave PUA is suppressed and the device presence reported from the master PUA are provided for the watchers on the slave PUA in the transparent manner by copying the data between PNASs.

Figure 7:
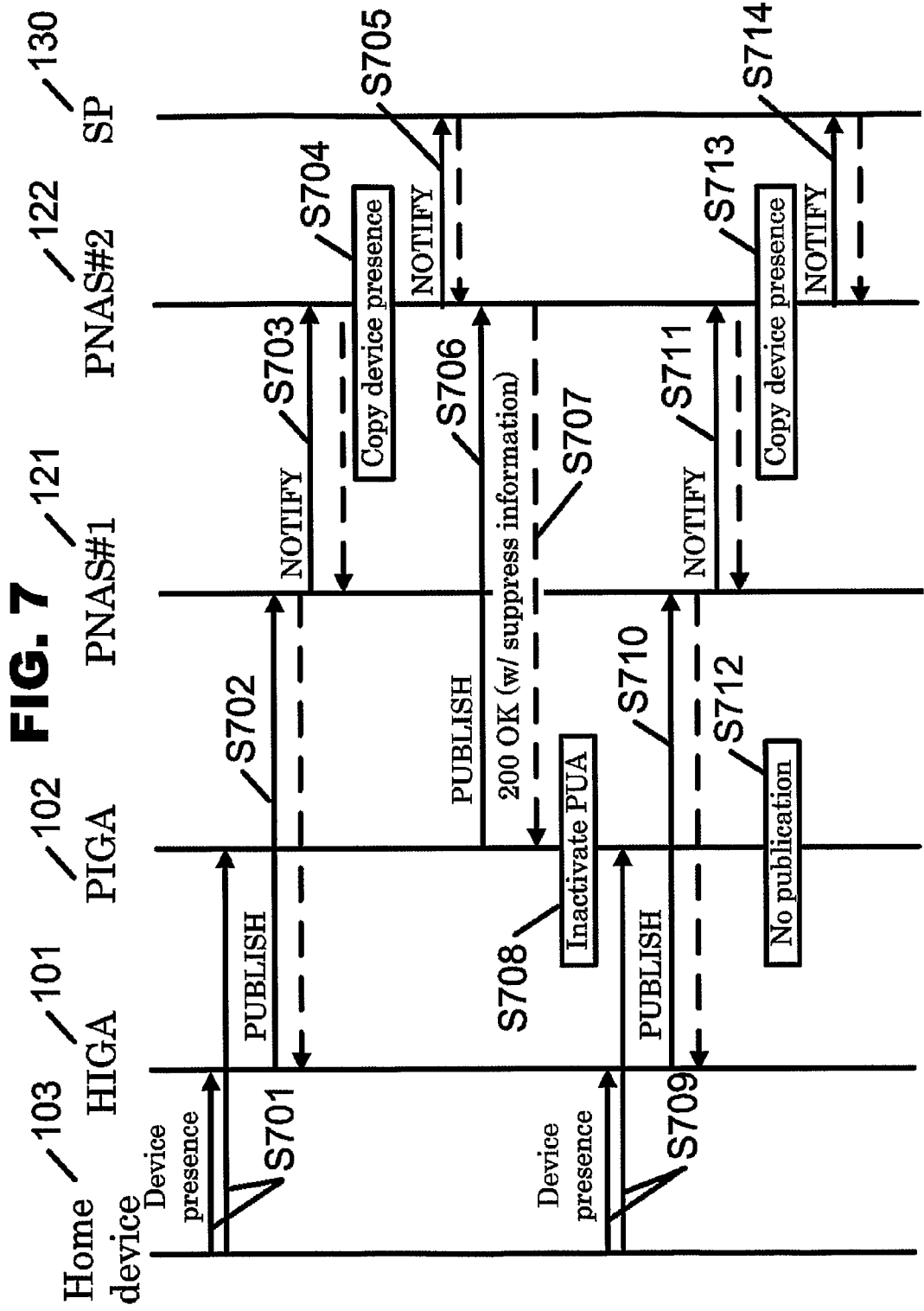
FIG. 7 shows an exemplary sequence diagram describing device presence publication from the master PUA and suppression of the device presence publication from the slave PUA according to the embodiment of the present invention.

FIG. 7 shows an exemplary sequence diagram describing device presence publication from the master PUA and suppression of the device presence publication from the slave PUA according to the embodiment of the present invention. As the precondition of the sequence diagram shown in FIG. 7, the service provider has already been subscribed for device presence at IMPU piga@ims2.net by sending SIP SUBSCRIBE towards PNAS#2 122. Note that the service provider in the sequence diagram is a passive receiver of the device presence information to show that it can still be notified of the device presence even after the PUA functionality in the PIGA is turned off. In FIG. 7, a dotted line indicates the "200 OK" response according to the SIP protocol corresponding to the SIP request immediately before it.

In step S701, the home device 103 advertises its presence on the local network of WLAN 104. The HIGA 101 and the PIGA 102 receive it. For example, a media renderer having uuid:12345 and a media server having uuid:23456 advertises their presence. In step S702, the HIGA 101 sends SIP PUBLISH to publish the received device presence to PNAS#1 121. The PNAS#1 121 updates its presence management table 222 based on device presence attached to the SIP PUBLISH. An example of the table updated is shown in FIG. 3A. The table 300 includes device presence regarding the media renderer and the media server.

In step S703, the PNAS#1 121 sends SIP NOTIFY including the device presence received from the HIGA 101 towards PNAS#2 122 as it has subscribed for the device presence at higa@ims1.net. In step S704, the PNAS#2 122 copies the device presence in the received NOTIFY message to piga@ims2.net, which triggers to send SIP NOTIFY to the service provider subscribed for piga@ims2.net in step S705. By this copy process, the presence management table 310 shown in FIG. 3B is updated as the one shown in FIG. 3C. In FIG. 3C, presence information regarding the media renderer and the media server is added.

In step S706, the PIGA sends SIP PUBLISH to publish the received device presence to PNAS#2 122. As the device presence has already been reported at step S703, this step does not trigger the notification to the service provider. In step S707, the PNAS#2 122 inserts an instruction to suppress PUA function of the PIGA in 200 OK response. PIGA inactivates its PUA function upon reception of it. An example of the header portions of 200 OK message necessary for explanation of this embodiment is shown as follows. Other portions which should be included in the header correspond to the standards of the corresponding RFC and 3GPP and their explanation will be omitted in this embodiment.

SIP/2.0 200 OK
Via: SIP/2.0/UDP 61.196.123.123; branch=z9hG4bK652hsge
To: <sip:piga@ims2.net>;tag=1a2b3c4d
From: <sip:piga@ims2.net>;tag=1234wxyz
Call-ID: 81818181@pnas.ims2.net
CSeq: 2 PUBLISH SIP-ETag: dx200xyz
Expires: 1800
P-Master-PUA-Identity: sip:higa@ims1.net In the above example, P-Master-PUA-Identity header can be used in the 200 OK response to indicate that the PNAS#1 121 copies the device presence from the HIGA 101 as the master PUA. This header is introduced according to the embodiment of the present invention. The "Expires" header indicates that the published information will expire after 1800 ms unless it is refreshed by another SIP PUBLISH received from the PIGA 102. The PIGA 102 must send SIP PUBLISH with empty body in order to refresh the lifecycle of the publication designated by this Expires header in the 200 OK of the last PUBLISH message. When the published information is expired, the presence copy from the PNAS#2 122 to PNAS#1 121 should be terminated as well.

The above steps S706 and S707 may take place before step S703. In that case, the PUBLISH message triggers the notification to the service provider at step S705 and the SIP NOTIFY from PNAS#1 121 does not trigger the notification to the service provider. Instruction to suppress the PUA function of PIGA 102 can be located in the body of 200 OK or in a SIP header.

In step S708, the PIGA 102 can inactivate its device discovery and event listening function or a part of it to save its computation and network resources more. The PIGA 102 can create an additional dialog with PNAS#2 122 using SIP SUBSCRIBE message to be notified of status changes in the HIGA 101, especially for restarting publication of device presence in case the HIGA 101 has suddenly been turned off. Detailed procedures will be described below with reference to FIGS. 8 and 9.

In steps S709 to S714 are basically the same as steps S701 to S705. However, since the PUA function of the PIGA 102 was inactivated at step S708, the PIGA 102 no longer sends SIP PUBLISH. By this, it is possible to save the network resource and the computation resource of the PIGA 102.

In the single operator case, the device presence copy is done internally in the PNAS 121 and the NOTIFY message at step S703 and S711 will be omitted.

Figure 8:
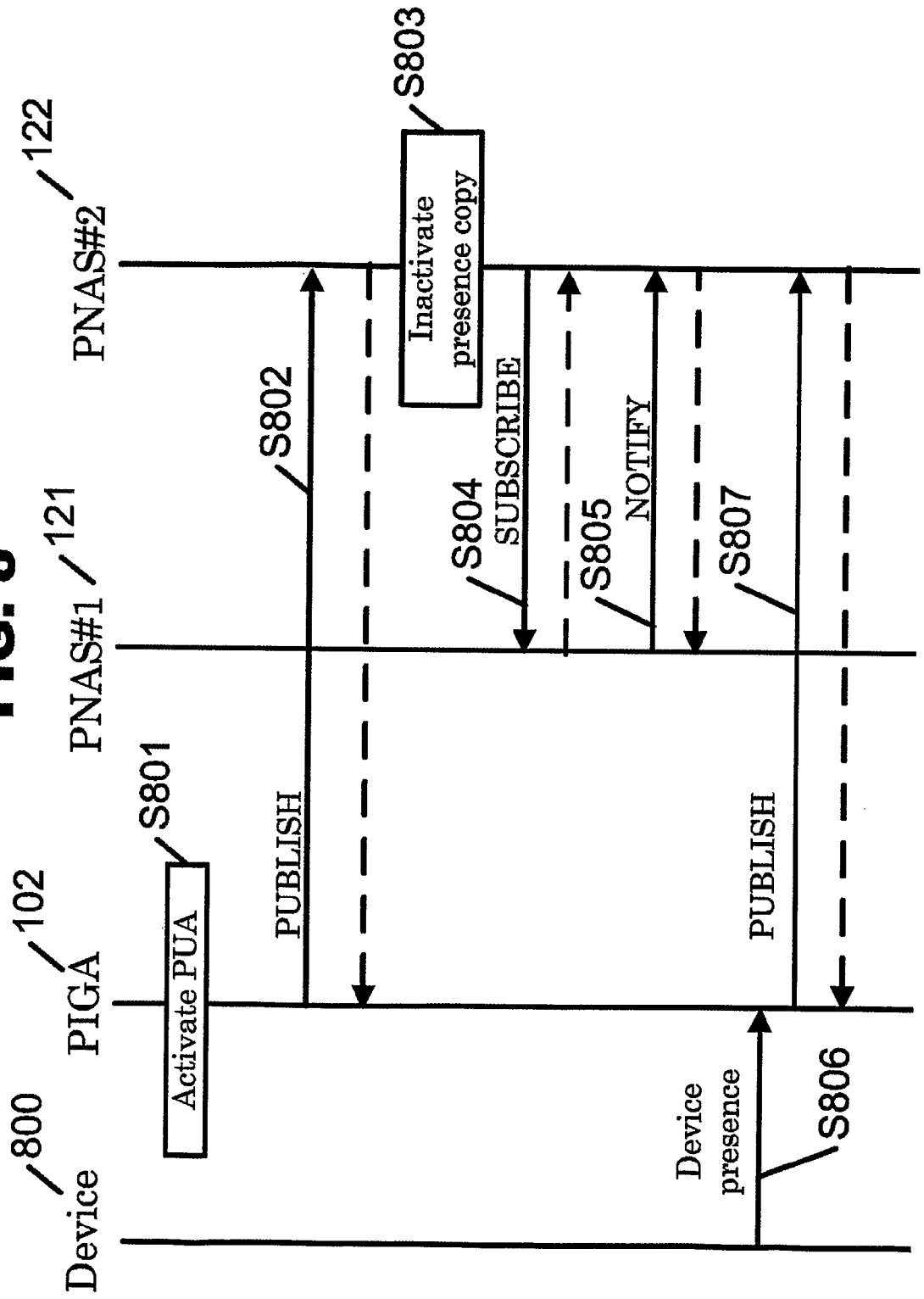
FIG. 8 shows an exemplary sequence diagram describing a case where the slave PUA leaves the local network according to the embodiment of the present invention.

While the PIGA 102 stay on the local network of WLAN 104, the procedures according to FIG. 7 will be continued. However, after the PIGA 102 leaves the local network of WLAN 104, it must activate the PUA functionality and request for stopping synchronization from the master PUA as depicted in FIG. 8. Although the termination of the synchronization is triggered when the PIGA 102 leaves the local network of WLAN 104 in this context, the PIGA 102 may initiate this procedure without leaving the local network of WLAN 104 for whatever reason. In FIG. 8, a dotted line indicates the "200 OK" response according to the SIP protocol corresponding to the SIP request immediately before it.

In FIG. 8, when the PIGA 102 detects that it has disconnected from the local network of WLAN 104, in step S801 it activates its PUA function which has been inactivated. In step S802, the PIGA 102 sends SIP PUBLISH to indicate that to PNAS#2 122. In step S803, the PNAS#2 122 inactivates the presence copy function. In step S804, the PNAS#2 122 sends SIP SUBSCRIBE towards the PNAS#1 121 to unsubscribe for device presence of higa@ims1.net. In step S805, the PNAS#1 121 sends SIP NOTIFY to indicate that the subscription has been terminated to PNAS#2 122.

When the PIGA 102 is connected to another network, for example, it has moved from the residential WLAN 104 to a car network, it receives device presence from device 800 or some events on the newly connected network in step S806. In step S807, the PIGA 102 sends SIP PUBLISH to publish the device presence to the PNAS#2 122.

Figure 9:
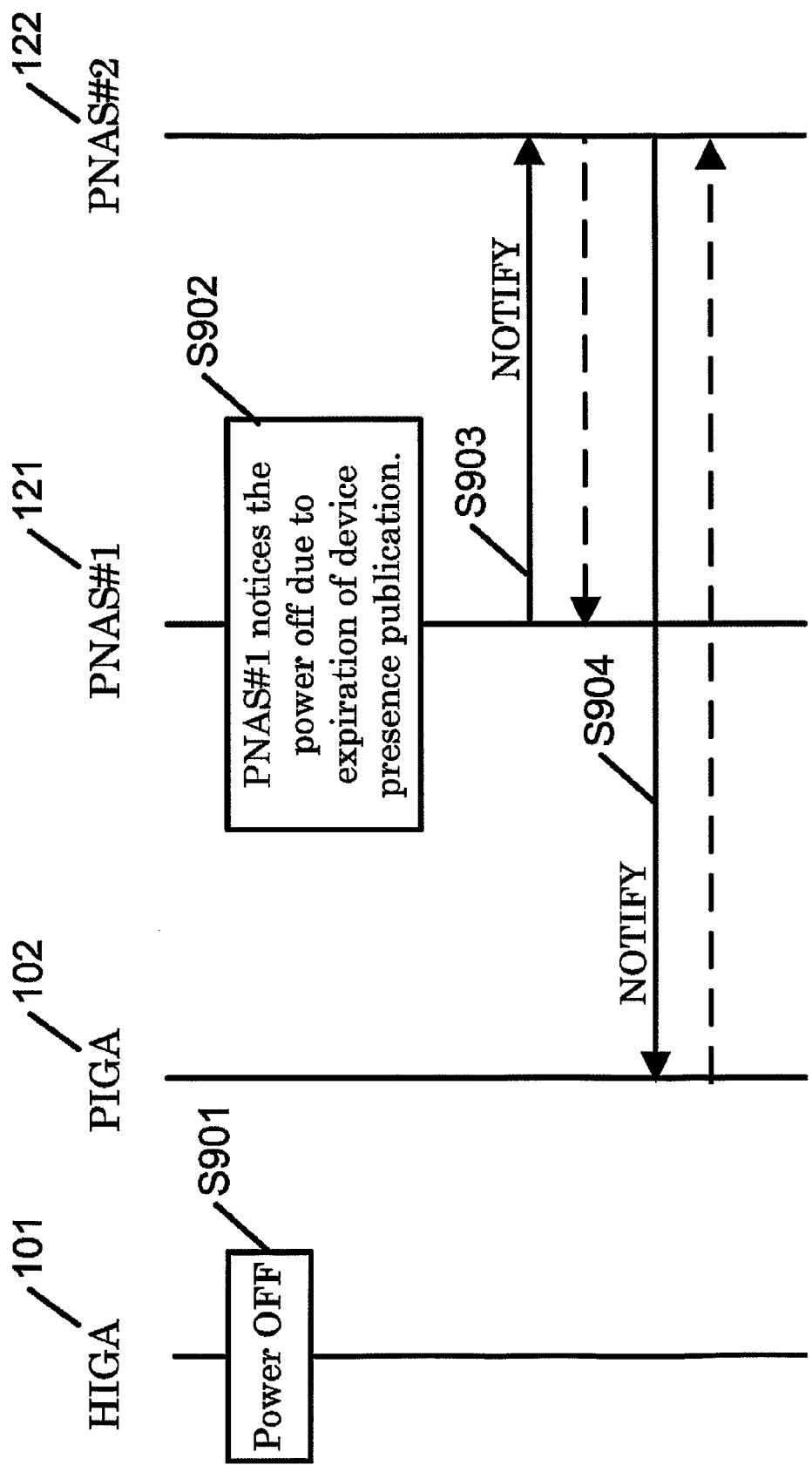
FIG. 9 shows an exemplary sequence diagram describing a case where the master PUA does not exist on the local network and the slave PUA notices it.

The above procedure corresponding to FIG. 8 may be applied to a case where the HIGA 101 is turned off and the PIGA 102 notices it locally. However in case the PIGA 102 cannot detect it locally, it must be notified from the PNAS over the additional dialog setup as shown in FIG. 9 In FIG. 9, a dotted line indicates the "200 OK" response according to the SIP protocol corresponding to the SIP request immediately before it.

In step S901, the HIGA 101 is turned off and the PIGA 102 does not detect it. In step S902, the PNAS#1 121 detects that the HIGA 101 has been turned off. Though the PNAS#1 121 may not be able to detect the turn off directly, the HIGA 101 can be regarded as turned off when there is no PUBLISH message sent from the HIGA 101 for the lifetime of the publication specified by Expires header. The PNAS#1 121 may receive a registration event from S-CSCF over ISC to know un-registration of the HIGA 101.

In step S903, the PNAS#1 121 sends NOTIFY message to the PNAS#2 122 with the session terminated. In step S904, the PNAS#2 122 sends NOTIFY message to the PIGA 102 over the additional dialog setup in order to indicate that the master PUA (i.e. HIGA 101) no longer exists on the local network of WLAN 104. Then the PIGA 102 activates PUA function and start publishing device presence to the PNAS#2 122.

In the following, a case where the master PUA role is moved to other IMS gateway apparatus will be described with reference to FIG. 10. The battery life of IMS gateway apparatus (xIGA) could be one motivation to pass the master PUA role to another. The movement can take place when the xIGA hosting the master PUA is running out of the battery, or more aggressively the master PUA role can be circulated regularly to save the battery equally among the group of xIGA. Another motivation is that a new xIGA is added to the local network and it is more suitable for taking the master PUA role than the current one in terms of capacity.

Figure 10:
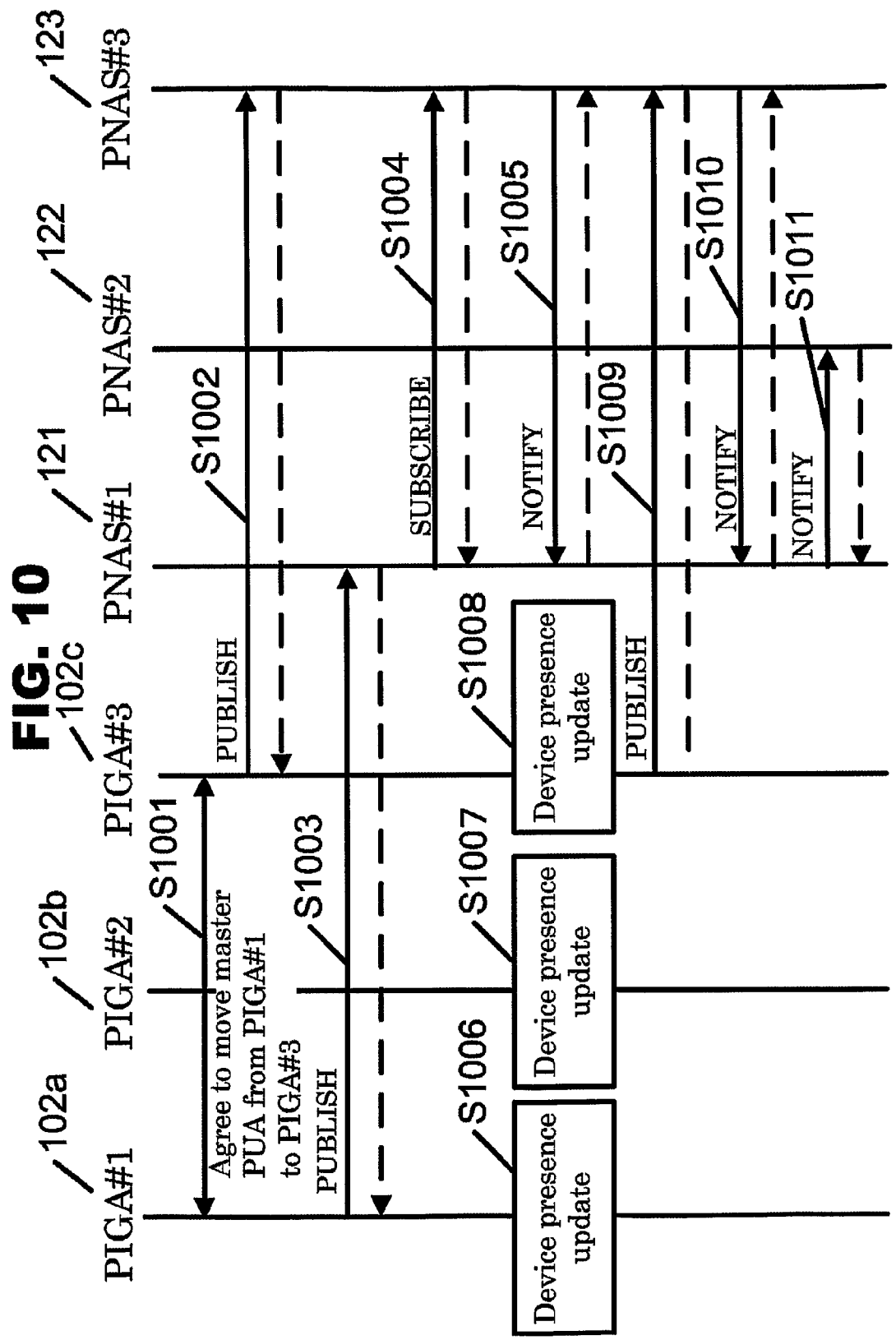
FIG. 10 shows an exemplary sequence diagram describing a case where the master PUA role is moved to other IMS gateway apparatus according to the embodiment of the present invention.

One way to move the master PUA role is that the current master PUA becomes the slave PUA for the new master PUA, while it still serves as the master PUA for the other slaves as described in FIG. 10. FIG. 10 describes a case corresponding to FIG. 1C where there exists the PIGA#1 102a and the PIGA #2 102b each of which is connected to IMS#1 111 having PNAS#1 121 and IMS#2 112 having PNAS#2 122. IMS networks of the IMS#1 111 and the IMS#2 112 are operated by different operators. The PIGA#1 102a is the master PUA of the PIGA#2 102b. This means that device presence from the PIGA#2 102b is suppressed and the device presence from the PIGA#1 102a is copied from the PNAS#1 121 to the PNAS#2 122. PIGA#3 joins to the local network of WLAN 104 and it is connected to other IMS#3 113 having PNAS#3 123 operated by a operator different from ones of the IMS#1 111 and the IMS#2 112. In FIG. 10, a dotted line indicates the "200 OK" response according to the SIP protocol corresponding to the SIP request immediately before it.

In step S1001, when the PIGA#3 102c joins to the local network of WLAN 104, the PIGA#1 102a and the PIGA#3 102c negotiate locally and agree to move the master PUA from the PIGA#1 102a to the PIGA#3 102c.

In step S1002, the PIGA#3 102c sends SIP PUBLISH to indicate that PIGA#1 becomes a slave PUA to the PNAS#3 123. In step S1003, the PIGA#1 102a sends SIP PUBLISH to indicate that the PIGA#3 102c becomes the master PUA to the PNAS#1 121. In step S1004, the PNAS#1 121 sends SIP SUBSCRIBE to subscribe for the device presence of the PIGA#3 123. In step S1005, the PNAS#3 123 sends SIP NOTIFY to the PNAS#1 121 as the initial notify message.

When the device presence has changed in the local network of WLAN 104 in step S1006 to 1008, the PIGA#3 102*c* detects it and sends PUBLISH to report the device presence in step S1009. The PIGA#1 102*a* and the PIGA#2 102*c* may detect the device presence change but they don't send PUBLISH.

In step S1010, the PNAS#3 123 sends SIP NOTIFY to the PNAS#1 121 including the reported device presence change. In step S1011, the PNAS#1 121 sends SIP NOTIFY to the PNAS#2 122 as the PIGA#1 102*a* is still the master PUA for the PIGA#2 102*b*.

Figure 11:
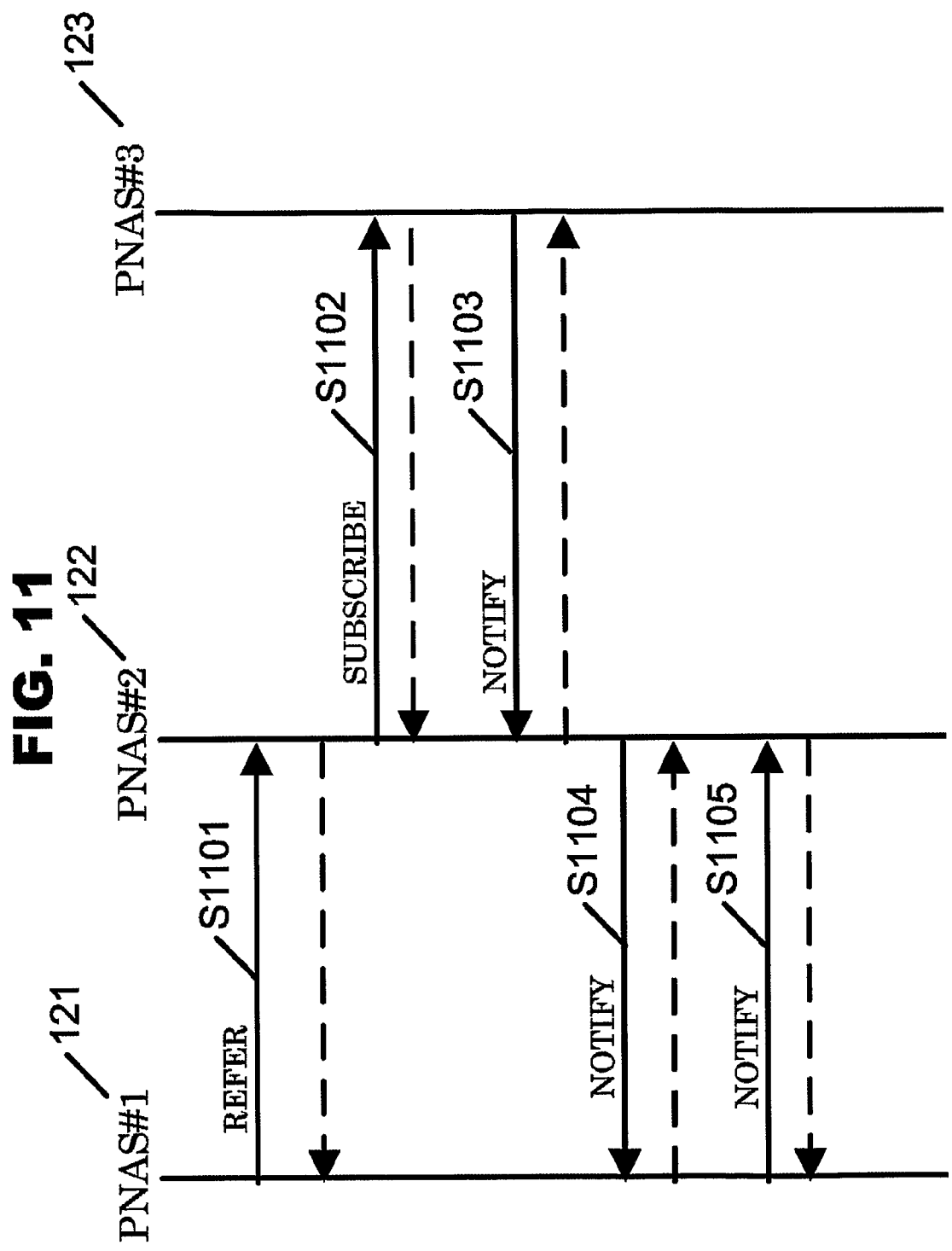
FIG. 11 shows an exemplary sequence diagram describing another case where the master PUA role is moved to other IMS gateway apparatus according to the embodiment of the present invention.

In another embodiment, another way to move the master PUA role is to release the master slave relationship once and setup the new master PUA as described in FIG. 11. In this case, the PNAS#1 121 may instructs the PNAS#2 122 to subscribe to the PNAS#3 123 using SIP REFER method according to RFC 3515 "SIP Refer Method". FIG. 11 shows the procedure for PNAS of a slave PUA subscribing to the new master PUA's PNAS, which follows step S1005 of FIG. 10. In FIG. 11, a dotted line indicates the "200 OK" response according to the SIP protocol corresponding to the SIP request immediately before it.

In step S1101, the PNAS#1 121 sends SIP REFER to the PNAS#2 122 in the existing SIP SUBSCRIBE/NOTIFY dialog. Refer-To header points to the IMPU of PIGA#3. An example of the header portions of REFER message necessary for explanation of this embodiment is shown as follows. Other portions which should be included in the header correspond to the standards of the corresponding RFC and 3GPP and their explanation will be omitted in this embodiment.

REFER sip:pnas.ims2.net SIP/2.0
Via: SIP/2.0/UDP pnas.ims1.net; branch=z9hG4bK2293940223
From: <sip:piga@ims1.net>;tag=12341234
To: <sip:piga@ims2.net>;tag=abcd1234
Call-ID: 898234234@pnas.ims1.net
CSeq: 1 REFER
Max-Forwards: 70
Refer-To: <sip:piga@ims3.net; method=SUBSCRIBE?Event=device_presence>
Contact: sip:pnas.ims1.net
Content-Length: 0

In step S1102, the PNAS#2 122 sends SUBSCRIBE request to the PNAS#3 123 to subscribe for the device presence of the PIGA#3 123. In step S1103, the PNAS#3 123 returns the initial NOTIFY message. In step S1104, the PNAS#2 122 sends NOTIFY message to the PNAS#1 121 to indicate that the session between the PNAS#2 122 and the PNAS#3 123 has successfully been established. In step S1105, the PNAS#1 121 sends NOTIFY message to the PNAS#2 122 to terminate the existing SIP SUBSCRIBE/NOTIFY dialog used to copy the device presence information.

Figure 4A:
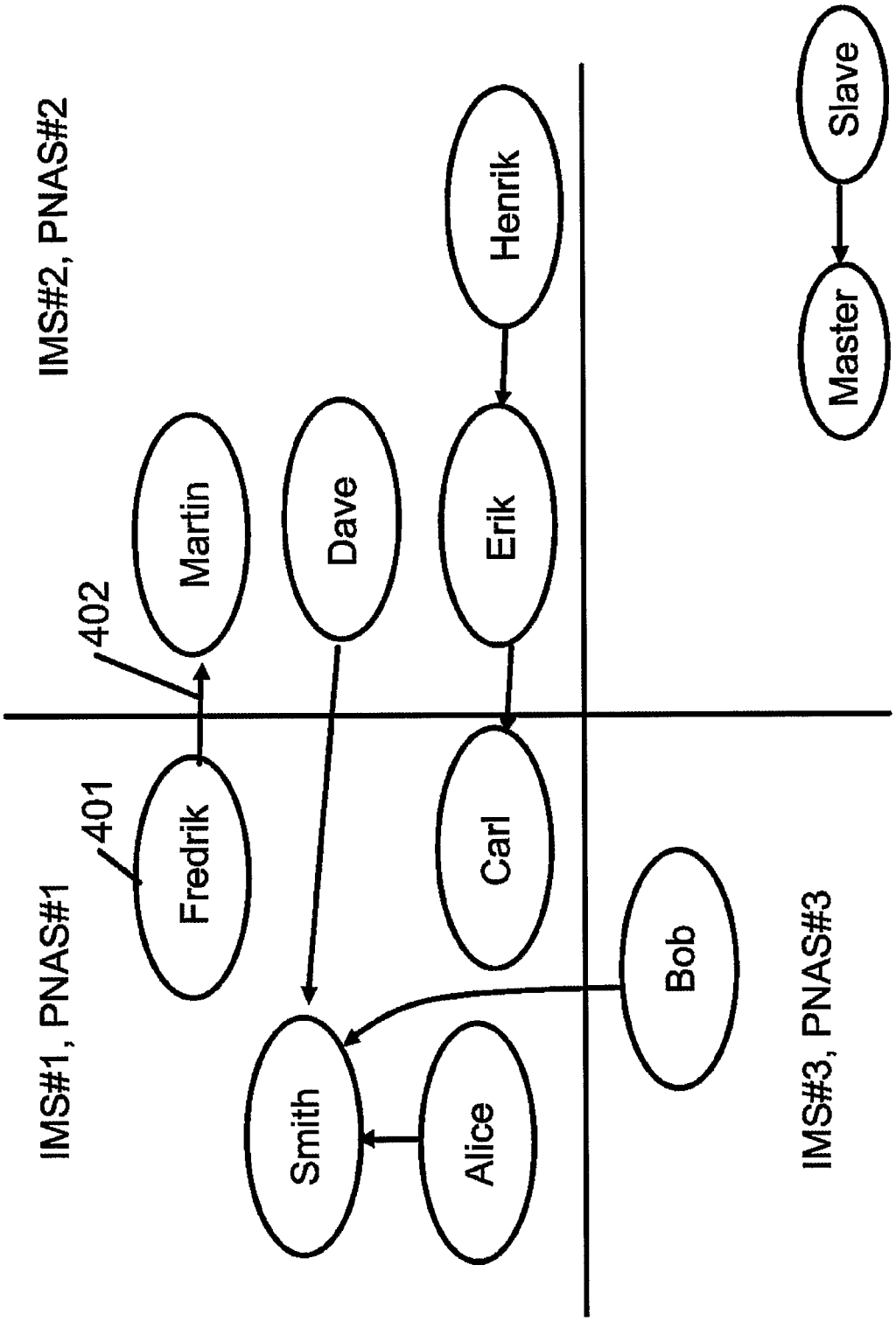
FIG. 4A shows an expanded case of another embodiment corresponding to FIG. 10.

FIG. 4A shows an expanded case of another embodiment corresponding to FIG. 10. In FIG. 4A, each node 401 indicates IMS gateway apparatus (xIGA) and arrows 402 connect two nodes represents a Master-Slave relationship between them. For example, xIGA of "Fredrik" is a slave of the xIGA of "Martin". The case shown in FIG. 4A, only xIGAs of "Martin", "Smith" and "Carl" publish the device presence to corresponding PNASs and other six xIGAs do not have to publish device presence. In order to achieve this system configuration, each PNAS corresponding to IMS network of any one of IMS#1 through IMS#3 has a Master-Slave relationship management table shown in FIG. 4B, 4C or 4D. Each table manages entries of Master IMPU (411, 421 or 431) and Slave IMPU (412, 422 or 432). By this, it is possible to manage relationship between a plurality of xIGAs.

According to the several aspects of embodiments of the present invention, it is possible to obtain following advantages. It should be noted that some embodiments may not achieve some of the following advantages, such embodiments are not excluded from the scope of the present invention.

It is possible to reduce consumptions of network resources and computation resources in xIGAs reporting the device presence. As the device presence information is updated much more frequently than the presence information of a person, these savings are very effective. It is also possible to reduce the energy consumption and prolongs the battery in case the xIGA is in a mobile phone or a portable device as the PIGA 102 in the embodiments. It is obvious benefit to the end users, but also to the operators. For example, several operators can form an alliance and appeal to the society that they are environmental friendly companies.

Furthermore, the solution of the present invention is transparent to device presence watchers such as a service provider. The watchers can receive the device presence information timely regardless this invention takes place.

The invention claimed is:

1. A first gateway apparatus configured to be connectable to a local network and an external network, to obtain presence information of a device apparatus on the local network and to provide the obtained presence information to a presence management apparatus on the external network, said first gateway apparatus comprising:

an obtaining unit configured to obtain the presence information of the device apparatus;

a transmitter configured to transmit the presence information to the presence management apparatus via the external network; and a receiver configured to receive, from the presence management apparatus, a suppression instruction of the presence information transmission, wherein said transmitter further configured to suppress the transmission of the presence information to the presence management apparatus in response to reception of the suppression instruction;

wherein, in response to when a second gateway apparatus is connected to the local network, and the external network and the presence management apparatus are shared by both of the first gateway apparatus and the second gateway apparatus, said transmitter is further configured to transmit a message to the presence management apparatus in order to designate the second gateway apparatus as a master of the first gateway apparatus, and said receiver is further configured to receive the suppression instruction from the presence management apparatus as a response to the transmitted message;

wherein the first gateway apparatus and the second gateway apparatus are IP multimedia system gateway apparatuses.

2. A first gateway apparatus according to claim 1, wherein, in response to when a second gateway apparatus is connected to the local network, and the external network and the presence management apparatus are shared by both of the first gateway apparatus and the second gateway apparatus, said receiver is further configured to receive the suppression instruction from the presence management apparatus as a response to the transmitted presence information.

3. A first gateway apparatus according to claim 1, wherein, in response to when a second gateway apparatus is connected to the local network, and the gateway apparatus uses the external network and the second gateway apparatus uses other external network than the external network,
said receiver is further configured to receive the suppression instruction from the presence management apparatus as a response to the transmitted presence information to the presence management apparatus.

4. A first gateway apparatus according to claim 3, further comprising:
a searching unit configured to search the second gateway apparatus on the local network; and
a request transmission unit configured to transmit a request to the second gateway apparatus to become a master of the first gateway apparatus,
wherein said transmitter is further configured to transmit a message designating the second gateway apparatus as the master of the first gateway apparatus to the presence management apparatus on the external network.

5. A first gateway apparatus according to claim 1, wherein in response to when the presence management apparatus notifies said first gateway apparatus that the second gateway apparatus does not exist on the local network, the suppression of the presence information transmission is released.

6. A first gateway apparatus according to claim 1, wherein in response to when the first gateway apparatus is disconnected from the local network, the suppression of the presence information transmission is released.

7. A presence management apparatus configured to manage presence information of a device apparatus on a local network, said presence management apparatus comprising:
a receiver configured to receive presence information from each of a plurality of gateway apparatuses connected to the local network and to obtain presence information from the device apparatus on the local network;
a determination unit configured to determine a master gateway apparatus and a slave gateway apparatus among the plurality of the gateway apparatuses; and
a transmitter configured to transmit a suppression instruction to the slave gateway apparatus as a response to the transmitted presence information from the slave gateway apparatus;
wherein the gateway apparatuses are IP multimedia system gateway apparatuses.

8. A presence management apparatus according to claim 7, wherein said determination unit is further configured to determine the master gateway apparatus and the slave gateway apparatus is based on a message designating the master gateway apparatus received from each gateway apparatus or on a predetermined rule.

9. A presence management apparatus according to claim 7, further comprising:
a presence table configured to manage presence information in association with each gateway apparatus; and
an updating unit configured to update said presence table,
wherein said updating unit updates the presence information associated with the slave gateway apparatus on said presence table according to the received presence information from the master gateway apparatus.

10. A presence management apparatus configured to manage presence information of a device apparatus on a local network, said presence management apparatus comprising:
a receiver configured to receive a message, from a first gateway apparatus configured to obtain presence information of a device apparatus on the local network, designating a second gateway apparatus on the local network as a master of the first gateway apparatus; and
a transmitter configured to transmit a suppression instruction of presence information transmission to the first gateway apparatus as a response to the received message;
wherein the first gateway apparatus and the second gateway apparatus are IP multimedia system gateway apparatuses.

11. A presence management apparatus according to claim 10, further comprising:
a presence table configured to manage presence information in association with a gateway apparatus; and
an updating unit configured to update said presence table,
wherein said updating unit updates the presence information associated with the first gateway apparatus on said presence table according to the received presence information from the second gateway apparatus.

12. A first presence management apparatus configured to manage presence information of a device apparatus on a local network, said first presence management apparatus comprising:
a receiver configured to receive a message, from a first gateway apparatus configured to obtain presence information of a device apparatus on the local network, designating a second gateway apparatus on the local network as a master of the first gateway apparatus; and
a transmitter configured to transmit a setting message which causes a second presence management apparatus associated with the second gateway apparatus to have a transmission setting of the presence information to the first presence management apparatus in response to when the second presence management apparatus receives the presence information from the second gateway apparatus,
wherein in response to when the presence information is received from the first gateway apparatus, said transmitter transmits a suppression instruction of the presence information transmission to the first gateway apparatus as a response to the received presence information;
wherein the first gateway apparatus and the second gateway apparatus are IP multimedia system gateway apparatus.

13. A first presence management apparatus according to claim 12, further comprising:
a presence table configured to manage presence information in association with the first gateway apparatus; and
an updating unit configured to update said presence table,
wherein said updating unit updates the presence information on said presence table according to presence information received from the second presence management apparatus.

14. A first presence management apparatus according to claim 12,
wherein said receiver is further configured to receive a notification of a disconnection of the first gateway apparatus from the local network, and
said transmitter is further configured to transmit a release message causes the second presence management apparatus to release a transmission setting of the presence information to the first presence management apparatus.

15. A first presence management apparatus according to claim 12,
wherein said receiver is further configured to receive a notification notifying that the second gateway apparatus does not exist on the local network from the second presence management apparatus, and said transmitter is further configured to transmit the notification to the first gateway apparatus.

16. A first presence management apparatus according to claim 12,
wherein in response to when a third gateway apparatus is connected to the local network and the third gateway apparatus become the master of the second gateway apparatus,
said transmitter is further configured to transmit
a setting message which causes a third presence management apparatus associated with the third gateway apparatus to have a transmission setting of the presence information to the first presence management apparatus in response to when the third presence management apparatus receives the presence information from the third gateway apparatus, and
a release message which causes the second presence management apparatus to release a transmission setting of the presence information to the first presence management apparatus.

17. A first presence management apparatus configured to manage presence information of a device apparatus on a local network, said first presence management apparatus comprising:
a receiver configured to receive
a message, from a first gateway apparatus configured to obtain presence information of a device apparatus on the local network, designating a second gateway apparatus as a slave of the first gateway apparatus,
a setting message, from a second presence management apparatus associated with the second gateway apparatus, causes the first presence management apparatus to transmit presence information to the second presence management apparatus in response to when the first presence management apparatus receives the presence information from the first gateway apparatus; and
a transmitter configured to transmit the presence information to the second presence management apparatus in response to when the presence information is received from the first gateway apparatus after the reception of the setting message;
wherein the first gateway apparatus and the second gateway apparatus are IP multimedia system gateway apparatuses.

18. A first presence management apparatus according to claim 17, further comprising:
a verification unit configured to verify the received setting message includes identification information indicating that the transmission of the setting message is for the second gateway apparatus,
wherein only in response to when said verification unit verifies the message includes the identification information, said transmitter transmits the presence information to the second presence management apparatus.

19. A first presence management apparatus according to claim 17, further comprising:
a detector configured to detect that the first gateway apparatus does not exist on the local network,
wherein in response to when the detector detects that the first gateway apparatus does not exist on the local network, said transmitter transmits a notification notifying the detection result to the second presence management apparatus.

20. A first presence management apparatus according to claim 17,
wherein in response to when a third gateway apparatus is connected to the local network and the third gateway apparatus become the master of the second gateway apparatus,
said transmitter further configured to transmit a setting message causes a third presence management apparatus associated with the third gateway apparatus to have a transmission setting of the presence information to the first presence management apparatus in response to when the third presence management apparatus receives the presence information from the third gateway apparatus, and to transmit the presence information to the second presence management apparatus in response to when the presence information is received from the third presence management apparatus.

* * * * *